United States Patent
Nonogaki (10) Patent No.: US 10,013,602 B2
(45) Date of Patent: Jul. 3, 2018

(54) FEATURE VECTOR EXTRACTION DEVICE BASED ON CELL POSITIONING

(71) Applicant: KABUSHIKI KAISHA TOSHIBA, Minato-ku, Tokyo (JP)

(72) Inventor: Nobuhiro Nonogaki, Taito Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 176 days.

(21) Appl. No.: 14/847,678

(22) Filed: Sep. 8, 2015

(65) Prior Publication Data

US 2016/0253570 A1 Sep. 1, 2016

(30) Foreign Application Priority Data

Feb. 27, 2015 (JP) .................. 2015-038549

(51) Int. Cl.
*G06K 9/00* (2006.01)
*G06K 9/46* (2006.01)

(52) U.S. Cl.
CPC . *G06K 9/00389* (2013.01); *G06K 2009/4666* (2013.01)

(58) Field of Classification Search
CPC ................... G06K 9/00389; G06K 2009/4666
See application file for complete search history.

(56) References Cited

U.S. PATENT DOCUMENTS

| 8,275,206 | B2 | 9/2012 | Iwai et al. |
| 9,002,115 | B2 | 4/2015 | Takahashi et al. |
| 9,361,507 | B1* | 6/2016 | Hoyos ................ G06K 9/00073 |
| 9,659,210 | B1* | 5/2017 | De la Torre ....... G06K 9/00241 |
| 2011/0182516 | A1 | 7/2011 | Iwai et al. |
| 2012/0328198 | A1 | 12/2012 | Takahashi et al. |
| 2013/0259391 | A1 | 10/2013 | Kawaguchi et al. |
| 2014/0163424 | A1 | 6/2014 | Kawaguchi et al. |
| 2014/0301605 | A1 | 10/2014 | Kawaguchi |

FOREIGN PATENT DOCUMENTS

| JP | 2006-252504 A | 9/2006 |
| JP | 2008-305099 A | 12/2008 |
| JP | 2011-154501 A | 8/2011 |
| JP | 2011-237970 A | 11/2011 |
| JP | 2012-123667 A | 6/2012 |
| JP | 2012-181736 A | 6/2012 |
| JP | 2012-155391 A | 8/2012 |
| JP | 2013-008093 A | 1/2013 |
| JP | 2013-125402 A | 6/2013 |

* cited by examiner

*Primary Examiner* — Bhavesh Mehta
*Assistant Examiner* — Menatoallah Youssef
(74) *Attorney, Agent, or Firm* — Knobbe, Martens, Olson & Bear, LLP (57) ABSTRACT

A feature vector extraction device includes a cell learning unit setting a plurality of cells representing a position and range for counting a feature vector of a target on the basis of a plurality of images containing a target for learning use. A normalizer selects two feature points from among three or more feature points which are set in an image and represent the target for learning use, and normalizes a size and direction of each of the feature points. A feature point calculator calculates a mean position and a variation from the relevant mean position for each of other feature points than the selected two feature points of the normalized feature points. A cell decision unit decides a position of each of the cells on the basis of the mean position and decides a size of the each of the cells on the basis of the variation.

13 Claims, 13 Drawing Sheets

| 16 | 8 | 62 | 4 | 16 | 24 | 28 | 44 | 0 | 2 | 98 | 192 | 131 | 195 | 193 | 227 |
|---|---|---|---|---|---|---|---|---|---|---|---|---|---|---|---|
| 241 | 0 | 10 | 6 | 251 | 0 | 0 | 0 | 195 | 129 | 195 | 195 | 195 | 195 | 195 | 195 |
| 108 | 164 | 0 | 163 | 64 | 192 | 195 | 195 | 195 | 195 | 195 | 195 | 195 | 223 | 223 | 223 |
| 0 | 222 | 159 | 239 | 196 | 129 | 195 | 195 | 195 | 223 | 223 | 253 | 189 | 29 | 62 | 28 |
| 185 | 0 | 6 | 2 | 194 | 135 | 223 | 255 | 189 | 60 | 60 | 60 | 28 | 30 | 30 | 30 |
| 0 | 0 | 131 | 143 | 135 | 159 | 63 | 60 | 28 | 62 | 60 | 28 | 28 | 28 | 28 | 28 |
| 200 | 149 | 25 | 12 | 159 | 63 | 60 | 60 | 60 | 60 | 28 | 60 | 60 | 60 | 28 | 28 |
| 0 | 34 | 0 | 0 | 63 | 60 | 60 | 60 | 28 | 28 | 28 | 62 | 60 | 60 | 28 | 30 |
| 140 | 255 | 200 | 191 | 57 | 48 | 56 | 16 | 24 | 28 | 62 | 56 | 56 | 60 | 28 | 62 |
| 4 | 62 | 8 | 127 | 112 | 112 | 64 | 240 | 48 | 0 | 112 | 112 | 48 | 32 | 48 | 24 |
| 30 | 63 | 0 | 78 | 230 | 96 | 224 | 96 | 96 | 240 | 96 | 96 | 224 | 224 | 224 | 32 |
| 44 | 0 | 190 | 16 | 79 | 228 | 224 | 193 | 225 | 225 | 64 | 192 | 227 | 225 | 225 | 224 |
| 2 | 178 | 0 | 190 | 0 | 223 | 239 | 229 | 225 | 225 | 225 | 193 | 227 | 193 | 225 | 225 |
| 129 | 113 | 0 | 64 | 160 | 0 | 2 | 222 | 255 | 253 | 253 | 193 | 225 | 225 | 225 | 225 |
| 255 | 112 | 24 | 12 | 68 | 255 | 181 | 0 | 6 | 14 | 30 | 28 | 223 | 223 | 223 | 223 |
| 127 | 124 | 4 | 0 | 26 | 28 | 126 | 12 | 143 | 31 | 63 | 12 | 30 | 28 | 28 | 30 |

| 16 | 241 | 108 | 0 | 185 | 0 | 200 | 0 | 140 | 4 | 30 | 44 | 2 | 129 | 255 | 127 |
|---|---|---|---|---|---|---|---|---|---|---|---|---|---|---|---|
| 8 | 0 | 164 | 222 | 0 | 0 | 149 | 34 | 255 | 62 | 63 | 0 | 178 | 113 | 112 | 124 |
| 62 | 10 | 0 | 159 | 6 | 131 | 25 | 0 | 200 | 8 | 0 | 190 | 0 | 0 | 24 | 4 |
| 4 | 6 | 163 | 239 | 2 | 143 | 12 | 0 | 191 | 127 | 78 | 16 | 190 | 64 | 12 | 0 |
| 16 | 251 | 64 | 196 | 194 | 135 | 159 | 63 | 57 | 112 | 230 | 79 | 0 | 160 | 68 | 26 |
| 24 | 0 | 192 | 129 | 135 | 159 | 63 | 60 | 48 | 112 | 96 | 228 | 223 | 0 | 255 | 28 |
| 28 | 0 | 195 | 195 | 223 | 63 | 60 | 60 | 56 | 64 | 224 | 224 | 239 | 2 | 181 | 126 |
| 44 | 0 | 195 | 195 | 255 | 60 | 60 | 60 | 16 | 240 | 96 | 193 | 229 | 222 | 0 | 12 |
| 0 | 195 | 195 | 195 | 189 | 28 | 60 | 28 | 24 | 48 | 96 | 225 | 225 | 255 | 6 | 143 |
| 2 | 129 | 195 | 223 | 60 | 62 | 60 | 28 | 28 | 0 | 240 | 225 | 225 | 253 | 14 | 31 |
| 98 | 195 | 195 | 223 | 60 | 60 | 28 | 28 | 62 | 112 | 96 | 64 | 225 | 253 | 30 | 63 |
| 192 | 195 | 195 | 253 | 60 | 28 | 60 | 62 | 56 | 112 | 96 | 192 | 193 | 193 | 28 | 12 |
| 131 | 195 | 195 | 189 | 28 | 28 | 60 | 60 | 56 | 48 | 224 | 227 | 227 | 225 | 223 | 30 |
| 195 | 195 | 223 | 29 | 30 | 28 | 60 | 60 | 60 | 32 | 224 | 225 | 193 | 225 | 223 | 28 |
| 193 | 195 | 223 | 62 | 30 | 28 | 28 | 28 | 28 | 48 | 224 | 225 | 225 | 225 | 223 | 28 |
| 227 | 195 | 223 | 28 | 30 | 28 | 28 | 30 | 62 | 24 | 32 | 224 | 225 | 225 | 223 | 30 |

| 16 | 241 | 108 | 0 | 185 | 0 | 200 | 0 | 140 | 4 | 30 | 44 | 2 | 129 | 255 | 127 |
|---|---|---|---|---|---|---|---|---|---|---|---|---|---|---|---|
| 8 | 0 | 164 | 222 | 0 | 0 | 149 | 34 | 255 | 62 | 63 | 0 | 178 | 113 | 112 | 124 |
| 62 | 10 | 0 | 159 | 6 | 131 | 25 | 0 | 200 | 8 | 0 | 190 | 0 | 0 | 24 | 4 |
| 4 | 6 | 163 | 239 | 2 | 143 | 12 | 0 | 191 | 127 | 78 | 16 | 190 | 64 | 12 | 0 |
| 16 | 251 | 64 | 198 | 194 | 135 | 159 | 63 | 57 | 112 | 230 | 79 | 0 | 160 | 68 | 26 |
| 24 | 0 | 192 | 129 | 135 | 159 | 63 | 60 | 48 | 112 | 96 | 228 | 223 | 0 | 255 | 28 |
| 28 | 0 | 195 | 195 | 223 | 63 | 60 | 60 | 56 | 64 | 224 | 224 | 239 | 2 | 181 | 126 |
| 44 | 0 | 195 | 195 | 255 | 60 | 60 | 60 | 16 | 240 | 96 | 193 | 229 | 222 | 0 | 12 |
| 0 | 195 | 195 | 195 | 189 | 28 | 60 | 28 | 24 | 48 | 96 | 225 | 225 | 255 | 6 | 143 |
| 2 | 129 | 195 | 223 | 60 | 62 | 60 | 28 | 28 | 0 | 240 | 225 | 225 | 253 | 14 | 31 |
| 98 | 195 | 195 | 223 | 60 | 60 | 28 | 28 | 62 | 112 | 96 | 64 | 225 | 253 | 30 | 63 |
| 192 | 195 | 195 | 253 | 60 | 28 | 60 | 62 | 56 | 112 | 96 | 192 | 193 | 193 | 28 | 12 |
| 131 | 195 | 195 | 189 | 28 | 28 | 60 | 60 | 56 | 48 | 224 | 227 | 227 | 225 | 223 | 30 |
| 195 | 195 | 223 | 29 | 30 | 28 | 60 | 60 | 60 | 32 | 224 | 225 | 193 | 225 | 223 | 28 |
| 193 | 195 | 223 | 62 | 30 | 28 | 28 | 28 | 28 | 48 | 224 | 225 | 225 | 225 | 223 | 28 |
| 227 | 195 | 223 | 28 | 30 | 28 | 28 | 30 | 62 | 24 | 32 | 224 | 225 | 225 | 223 | 30 |

FEATURE VECTOR EXTRACTION DEVICE BASED ON CELL POSITIONING

CROSS REFERENCE TO RELATED APPLICATIONS

This application is based upon and claims the benefit of priority from the prior Japanese Patent Application No. 2015-38549, filed on Feb. 27, 2015, the entire contents of which are incorporated herein by reference.

FIELD

An embodiment according to the present invention relates to a feature vector extraction device.

BACKGROUND

As a technology for identifying an object in image data, for example, there has been a technology in which a part-to-part arrangement in an object is evaluated to estimate an attitude of the object. This technology is based on the assumption that an object to be identified exists in an image, and thus, suits detection for details of the attitude of the object, but does not suit detection of presence or absence of the object, disadvantageously resulting in inability to identify the object with high accuracy.

Additionally, there has been a technology in which an entire area is detected and thereafter, each individual local area in the detected area is searched for a feature vector. However, this technology cannot accurately detect the entire area if the individual local area varies, disadvantageously resulting in deterioration in identification accuracy for the object.

Moreover, there has been a technology in which a likelihood is calculated for each detected feature point by comparison with a codebook, and the calculated likelihoods are collected to identify the object. However, this technology uses a detection result of the feature point, which varies the identification accuracy of the feature point depending on detection accuracy, disadvantageously leading to unsteady identification accuracy.

DETAILED DESCRIPTION

A feature vector extraction device according to this embodiment has a cell learning unit that sets a plurality of cells representing a position and range for counting a feature vector of a target on the basis of a plurality of images containing a target for learning use. The cell learning unit has a normalizer, a feature point calculator, and a cell decision unit. The normalizer selects two feature points from among three or more feature points which are set in an image and represent the target for learning use, and normalizes a size and direction of each of the feature points. The feature point calculator calculates a mean position and a variation from the relevant mean position for each of other feature points than the selected two feature points of the normalized feature points. The cell decision unit decides a position of each of the cells on the basis of the mean position and decides a size of the each of the cells on the basis of the variation.

Hereinafter, a description is given of embodiments according to the present invention with reference to the drawings. The embodiments below focus on a characteristic configuration and operation of the feature vector extraction device, but the feature vector extraction device may have configurations and operations omitted in the description below. Those configurations and operations omitted are also included in a range of the embodiments.

First Embodiment

Figure 1:
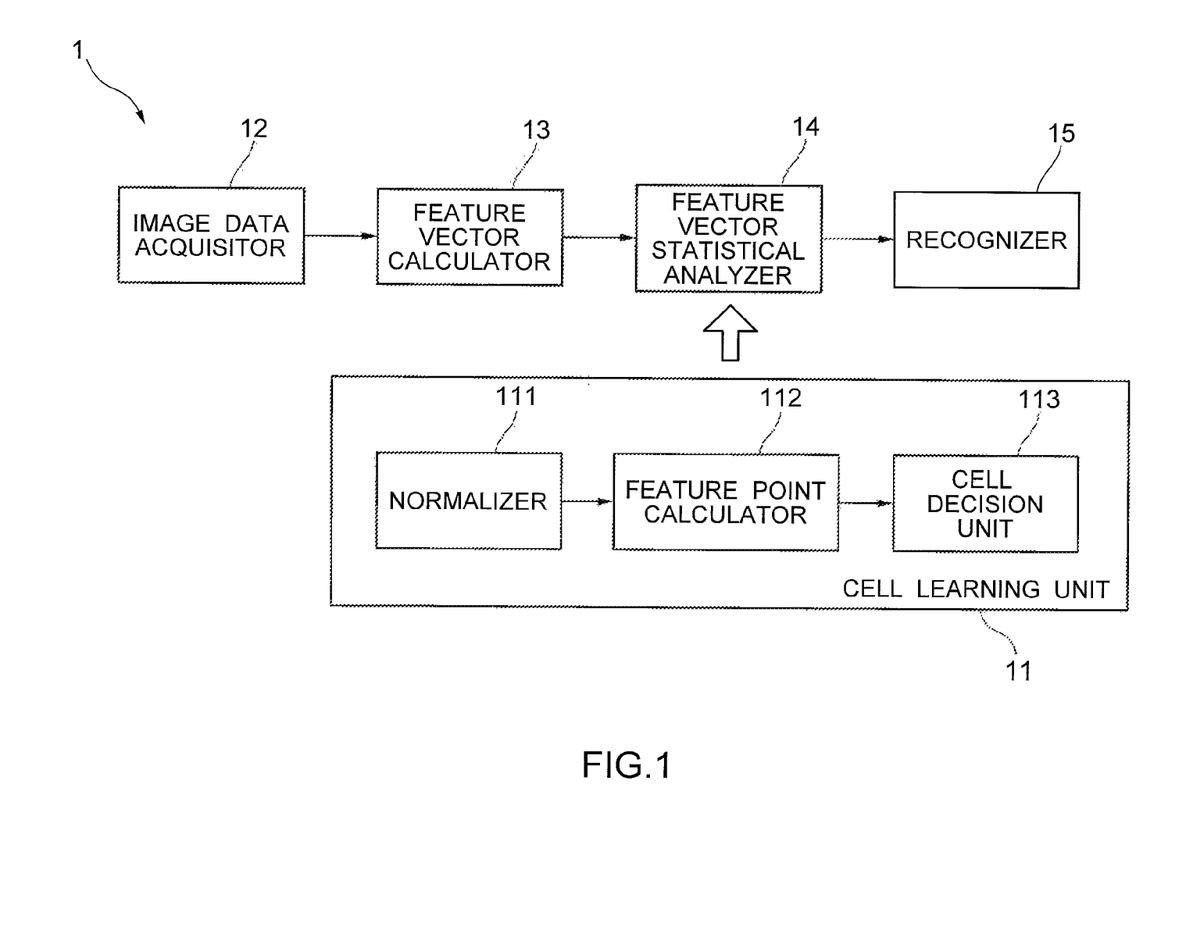
FIG. 1 is a block diagram of a feature vector extraction device 1 showing a first embodiment.

FIG. 1 is a block diagram of a feature vector extraction device 1 showing a first embodiment. The feature vector extraction device 1 in this embodiment is used, for example, to identify a predetermined object (hereinafter, also referred to as a target to be identified) from an image captured by a camera having an image sensor mounted thereon. The target to be identified is, for example, a multi-jointed body such as a human hand. A result of identifying the target to be identified is used for gesture input or the like.

The feature vector extraction device 1 includes an image data acquisitor 12, a feature vector calculator 13, a feature vector statistical analyzer 14, and a recognizer 15. Moreover, the feature vector extraction device 1 may include a cell learning unit 11. Each of the components 11 to 15 is, for example, hardware such as an arithmetic processing unit or a storage unit. Additionally, each of the components 11 to 15 may be mounted on one piece of apparatus or equipment, or a part of the components may be on a device (for example, a server or database on a cloud) communicable with other components via an external network.

(Cell Learning Unit 11)

The cell learning unit 11 sets a plurality of cells representing a position and range for counting a feature vector of a target on at least a part of each of a plurality of images of the target for learning use. The set plurality of cells are used in generating a histogram by the feature vector statistical analyzer 14. In a case where the target is, for example, a human hand, the cell learning unit 11 sets a cell having a range corresponding to a position of each of a tip or base of a finger, a position of a joint, a center region of a palm, and the like. The feature vector is a value obtained for each pixel of the target, and is, for example, a local binary pattern or its subspecific code pattern.

A purpose of setting the cell is as below. Whether or not the target is a target to be identified is determined on the basis of the histogram created via counting the feature vector of the target. If an area of which the feature vector is to be counted is spread over an area of all pixels of the image data, feature vector counting takes time to make a rapid identification impossible on whether or not the target is a target to be identified. In addition, a process having little effect on identification accuracy may be involved in vain such as that the feature vector is counted in an area where the feature point in the target to be identified exists with a low existence probability from a statistical point of view. Therefore, the cell learning unit 11 sets the cells at plural locations in the image of the target for learning use so as to limit a count area for the feature vector to an area having the statistically high existence probability of the feature point in the target to be identified. These cells are each an area representing a feature portion of the target for learning use, and these cells are used to be able to rapidly identify with high accuracy whether or not the target is a target to be identified.

Note the cell learning unit 11 may use a target as a target for learning use in a case where the recognizer 15 identifies the relevant target. This allows the identification result to be effectively used as learning data.

The cell learning unit 11 includes a normalizer 111, a feature point calculator 112, and a cell decision unit 113.

(Normalizer 111)

The normalizer 111 uses two feature points from among three or more feature points set in each of a plurality of images of the target for learning use to normalize a size and direction of each feature point. Here, the feature point is set at any location which may be used for a feature in the target for learning use.

The normalizer 111 selects any two feature points in the target for learning use to normalize the target for learning use to a reference direction and a reference size. Two feature points are each, for example, a point positioned at the centermost region of the target for learning use. If the target for learning use is rotated from the reference direction, the normalizer 111 corrects an inclination of a line segment connecting two feature points for normalization. Moreover, if the size of target for learning use is different from the reference size, the normalizer 111 corrects a distance between two feature points to a certain value for normalization. In other words, the normalizer 111 eliminates a difference in presence or absence of rotation and difference in the size of a plurality of targets for learning use to make the feature point in each target for learning use be set to the reference. Note the feature point may be, for example, manually set (taught) by operating an input device or automatically set through image recognition and the like.

(Feature Point Calculator 112)

The feature point calculator 112 calculates a mean position and variation from the mean position of the feature points other than two feature points used for normalization. The mean position refers to a mean value of positions of the feature points other than two feature points used for normalization. The variation is, for example, a variance, a standard deviation or the like. For example, the variance can be found by an eigenvalue of $(X-u)(X-u)^T$, under an assumption that a midpoint of two feature points is the origin $(0, 0)$, a vector of coordinates $(x, y)$ of each of other feature points is X, and a vector (mean vector) of the mean position of the feature points is u. $(X-u)^T$ is a transposed matrix of $(X-u)$.

(Cell Decision Unit 113)

The cell decision unit 113 decides an area for the cell on the basis of the calculated mean position of the respective feature points. The mean position can be considered to be statistically high in the existence probability of the identical feature point in a plurality of targets for learning use. Therefore, the cell is set to an area having the high existence probability of the relevant feature point. If the target is the same kind as the target for learning use, the feature vector of the target counted by use of such a cell represents the feature point in the target for learning use with a high probability. Therefore, the cell decision unit 113 decides an object including the feature point in the target for learning use, that is, the cell capable of identifying the target to be identified with high accuracy.

Further, the cell decision unit 113 decides the size of the cell on the basis of the variation of the calculated mean position of the respective feature points. More specifically, the cell decision unit 113 decides the size of the cell on the basis of a value obtained by multiplying the variance by a constant. Here, the target for learning use includes, for example, a portion where a deviation increases when a degree of movement freedom is high (that is, individual variability is large), such a finger joint portion. In the portion having a large deviation, an existence probability of the relevant portion is high across a wide area as compared with a portion having a small deviation. The cell decision unit 113 takes into account a distribution of the existence probability of the feature point depending on the deviation to decide the size of the cell. In other words, if the deviation is large, the size of the cell is increased. Therefore, the cell having the feature point of the portion of large movement can be set with less omission by the cell decision unit 113. Note the value obtained by multiplying the variance by a constant may be set depending on a kind of the target. In a way like this, even if a magnitude of the movement varies depending on a kind of the target to be identified, any of the respective kinds of the target to be identified can be set with less omission.

(Image Data Acquisitor 12)

The image data acquisitor 12 acquires image data containing a target and outputs the acquired image data to the feature vector calculator 13. The image data acquisitor 12 may be, for example, an image sensor, a device for inputting image data captured by the relevant image sensor, or a device for acquiring image data by other methods.

(Feature Vector Calculator 13)

The feature vector calculator 13 calculates the feature vector for each pixel on the basis of the image data. The feature vector calculator 13 outputs the calculated feature vector to the feature vector statistical analyzer 14.

(Feature Vector Statistical Analyzer 14)

The feature vector statistical analyzer 14 counts the feature vector in the image for each cell on the basis of the feature vector calculated by the feature vector calculator 13 and the cell set by the cell learning unit 11. Specifically, the feature vector statistical analyzer 14 sets each of a plurality of cells obtained by the cell learning unit 11 over a pixel area corresponding to the position and size of the relevant cell in the image containing the target. For example, the feature vector statistical analyzer 14 may apply a distribution of the normalized feature point as training data used in the cell learning unit to a normal distribution and set an area (which may be a rectangular or a ellipse) centering on the mean position and having a size obtained by multiplying a standard deviation a by a constant (e.g., 2σ or 3σ). At this time, the size of the cell may be adjusted in conformity with the size of the image in some cases. Then, the feature vector statistical analyzer 14 generates a histogram obtained by counting the feature vector for each cell set in the image. Here, the feature vector statistical analyzer 14 uses the area (cell) having the high existence probability of the feature point as the count area for the feature vector, and thus, can rapidly generate a histogram representing a frequency of the feature vector (the number of appearances of a binary pattern). Then, the feature vector statistical analyzer 14 outputs the generated histogram to the recognizer 15.

(Recognizer 15)

The recognizer 15 uses the histogram to determine whether or not the target is a target to be identified. Here, the recognizer 15 analyzes the histogram representing the distribution of the appearance frequency of the binary pattern to be able to identify whether or not the target is a target to be identified with high accuracy. The recognizer 15 may be a support vector machine (SVM). Note the recognizer 15 may compare a reference histogram created in advance on the basis of the target for learning use with the histogram generated by the feature vector statistical analyzer 14 to determine whether or not the target is a target to be identified.

Hereinafter, with reference to the drawings, a description is given of a feature vector extraction method of the feature vector extraction device 1, the description being divided into a cell learning operation and a recognizing operation.

(Cell Learning Operation)

Figure 2:
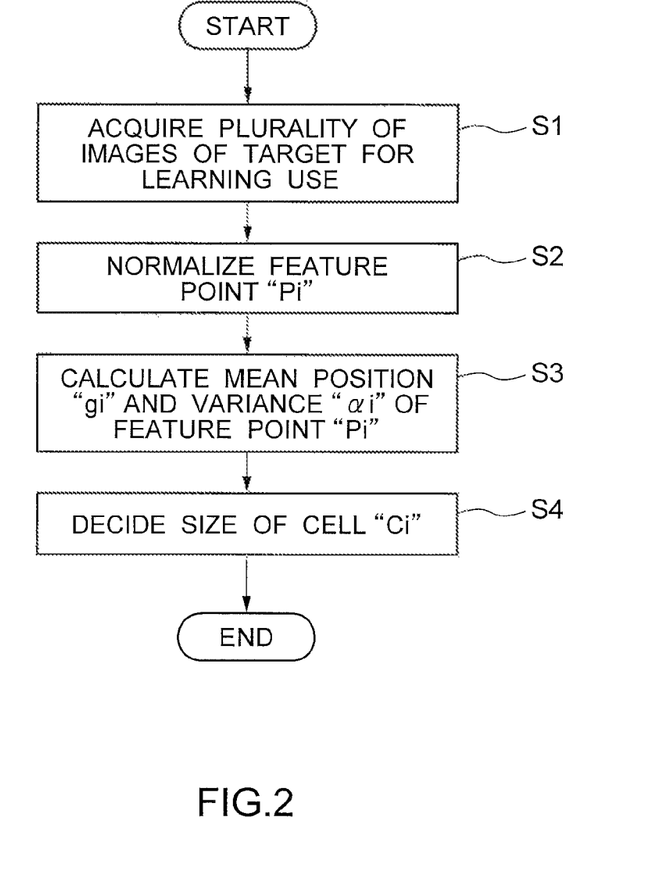
FIG. 2 is a flowchart showing a cell learning operation of the feature vector extraction device 1 in FIG. 1.
Figure 3:
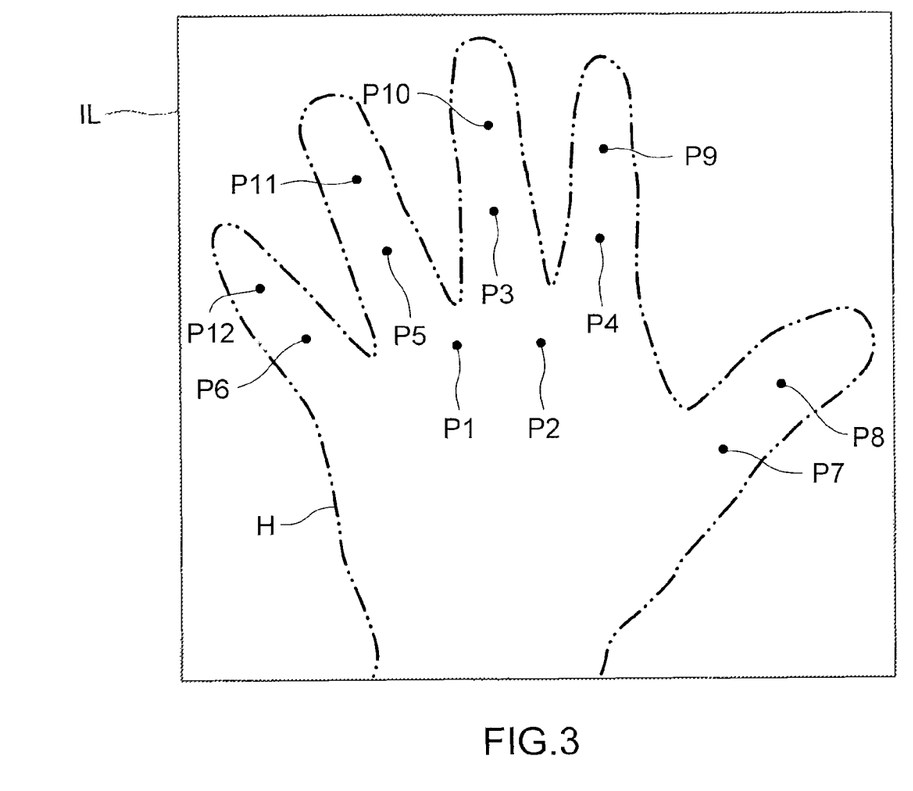
FIG. 3 is an illustration for explaining the cell learning operation.

FIG. 2 is a flowchart showing a cell learning operation of the feature vector extraction device 1. FIG. 3 is an illustration for explaining the cell learning operation. Here, a description is given using a human hand as the target for learning use.

The cell learning unit 11, first, acquires a plurality of images IL of a human hand H as images of the target for learning use (S1). Each image IL has three or more common feature points "Pi" ("i" is a natural number) set thereon in advance. As shown in FIG. 3, for example, assume that center two feature points "P1" and "P2" represent a center of a hand H, and other feature points "Pi" (i≥3) represent finger joint portions or the like. Note the feature point "Pi" shown in FIG. 3 is merely an example, and many more feature points may be actually set. The cell learning unit 11 may acquire each image IL from a storage area or external storage unit not shown of the cell learning unit 11, or acquire from an image pickup device such as an image sensor as needed.

Subsequently, the normalizer 111 selects the feature points "P1" and "P2" to normalize a size and direction of the feature point "Pi" (S2). The normalizer 111 unifies, in each image IL, a distance between the feature points "P1" and "P2" and an inclination of a line segment connecting the feature points "P1" and "P2", for example, through coordinate transformation or the like. This allows the size and direction of the hand H to be equal between the respective images IL.

Subsequently, the feature point calculator 112 calculates a mean position "gi" (i≥3) and a variance "σi" (i≥3), for example, as a variation from the mean position "gi" in terms of the feature points "Pi" (i≥3) normalized for each image IL (S3).

Figure 4:
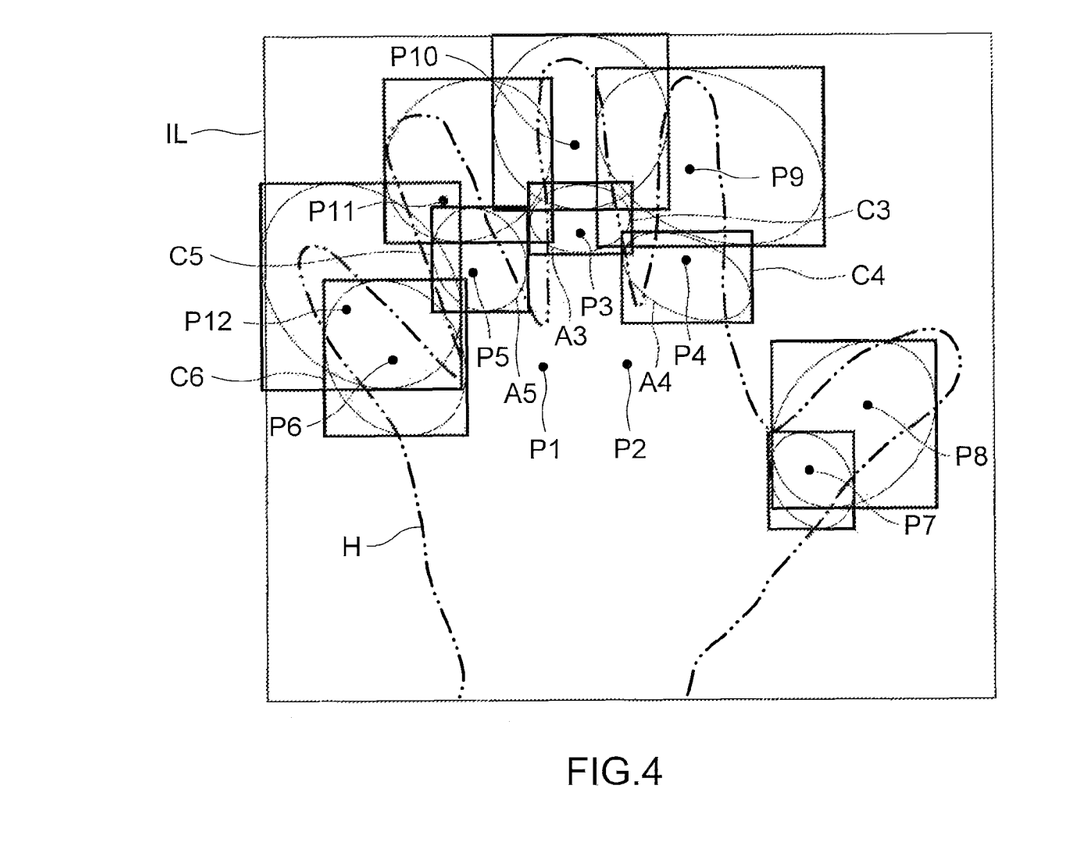
FIG. 4 is an illustration for explaining the cell learning operation following FIG. 3.

Subsequently, the cell decision unit 113 decides a position of each cell on the basis of the mean position "gi" and decides a size of each cell on the basis of the variance "σi" (S4). FIG. 4 is an illustration in which the cells are set in the image IL. For example, the cell decision unit 113 decides that a cell "Ci" is a rectangular area circumscribing an area "Ai" (substantially circular or substantially ellipsoidal area), the area "Ai" centering on the mean position "gi" and having a size obtained by multiplying the variance "σi" by a constant. The decision that the cell is a rectangular area slightly larger than an area obtained by multiplying the variance by a constant allows the feature vector statistical analyzer 14 to detect the distribution of the feature vectors with good accuracy even if the target for learning use and a target to be detected are slightly different from each other in the distribution of the feature points.

(Recognizing Operation)

Figure 5:
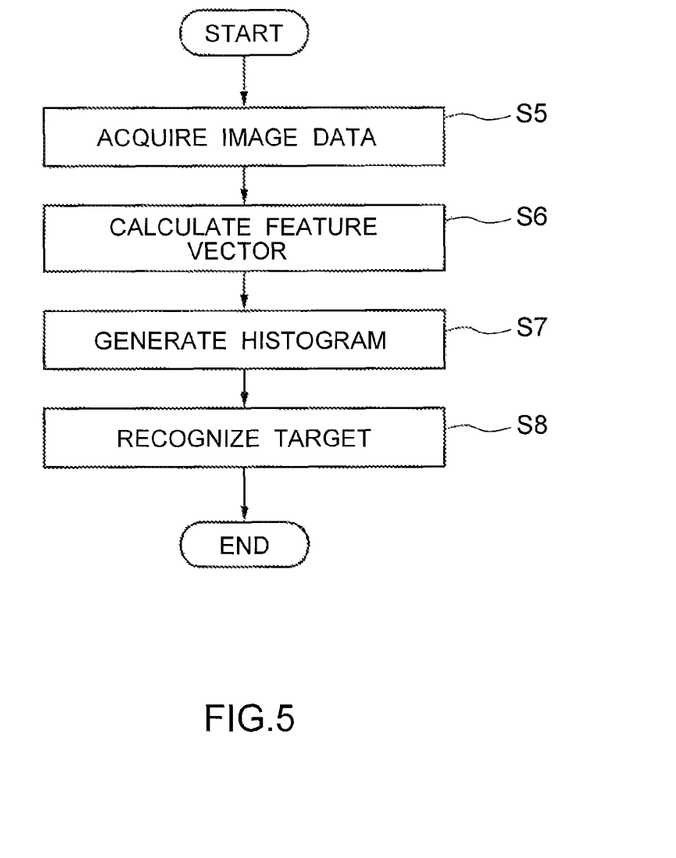
FIG. 5 is a flowchart showing a recognizing operation of the feature vector extraction device 1 in FIG. 1.
Figure 6:
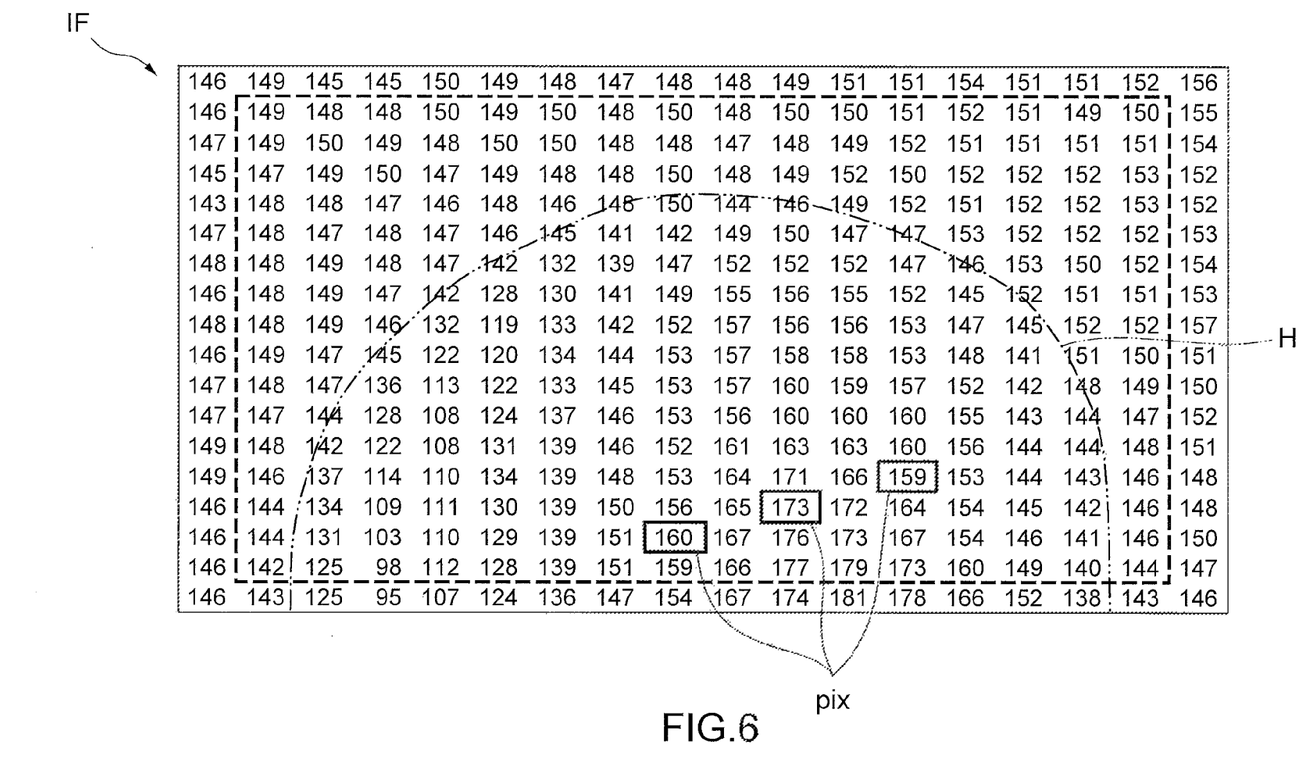
FIG. 6 is an illustration for explaining the recognizing operation.

FIG. 5 is a flowchart showing an identifying operation of the feature vector extraction device 1. First, the image data acquisitor 12 acquires image data IF (S5). FIG. 6 shows the image data IF of a human fingertip portion with pixel values (brightness values) of 256 gradations of respective pixels pix. In FIG. 6, the brighter pixel pix, the larger the pixel value, and the darker pixel pix, the smaller pixel value.

Subsequently, the feature vector calculator 13 calculates the feature vector on the basis of the image data IF (S6). The feature vector calculator 13 calculates a binary pattern BP on the basis of a magnitude relationship of the pixel values between a pixel of interest pix_c and eight peripheral pixels pix_p1 to pix_p8 surrounding the pixel of interest pix_c. This binary pattern represents the feature vector of the pixel of interest.

Figure 7A:
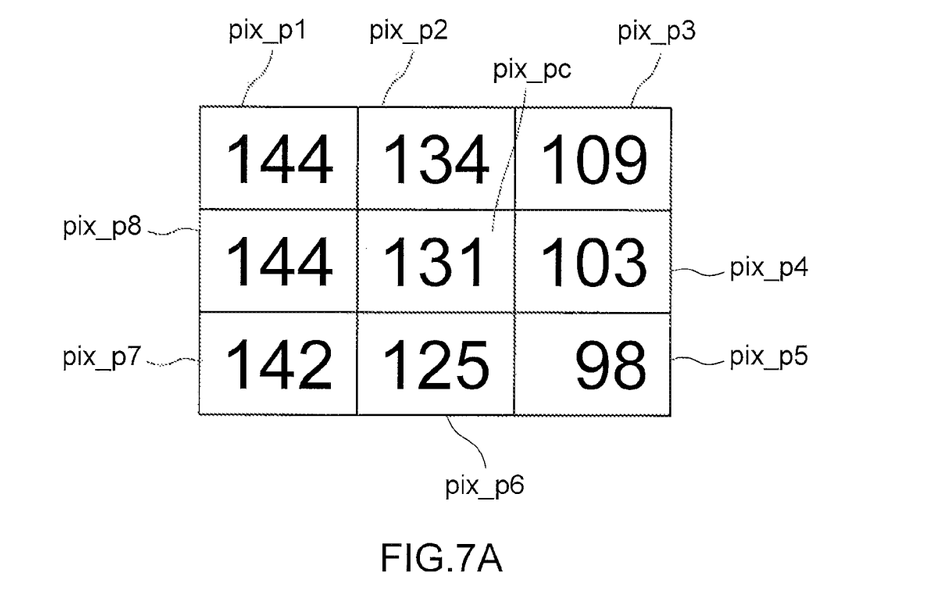
FIGS. 7A to 7C are each an illustration for explaining the recognizing operation following FIG. 6.
Figure 7B:
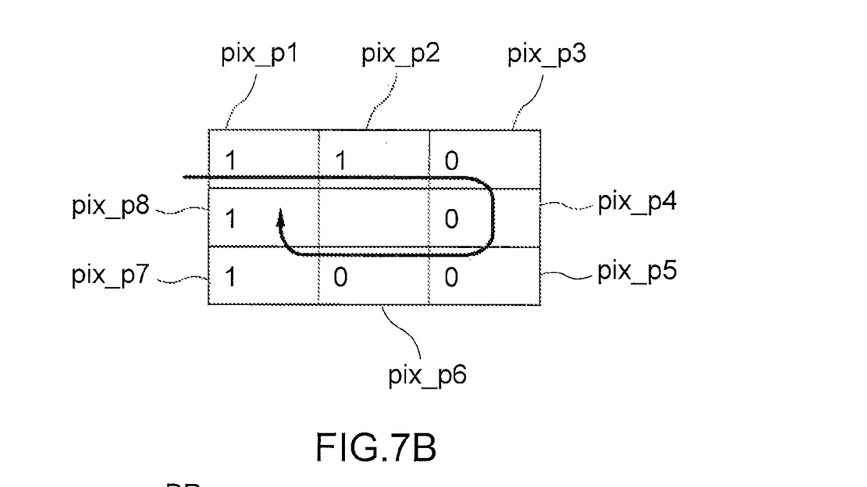
Figure 7C:
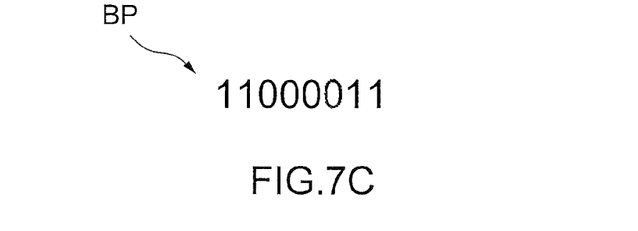
Figure 8:
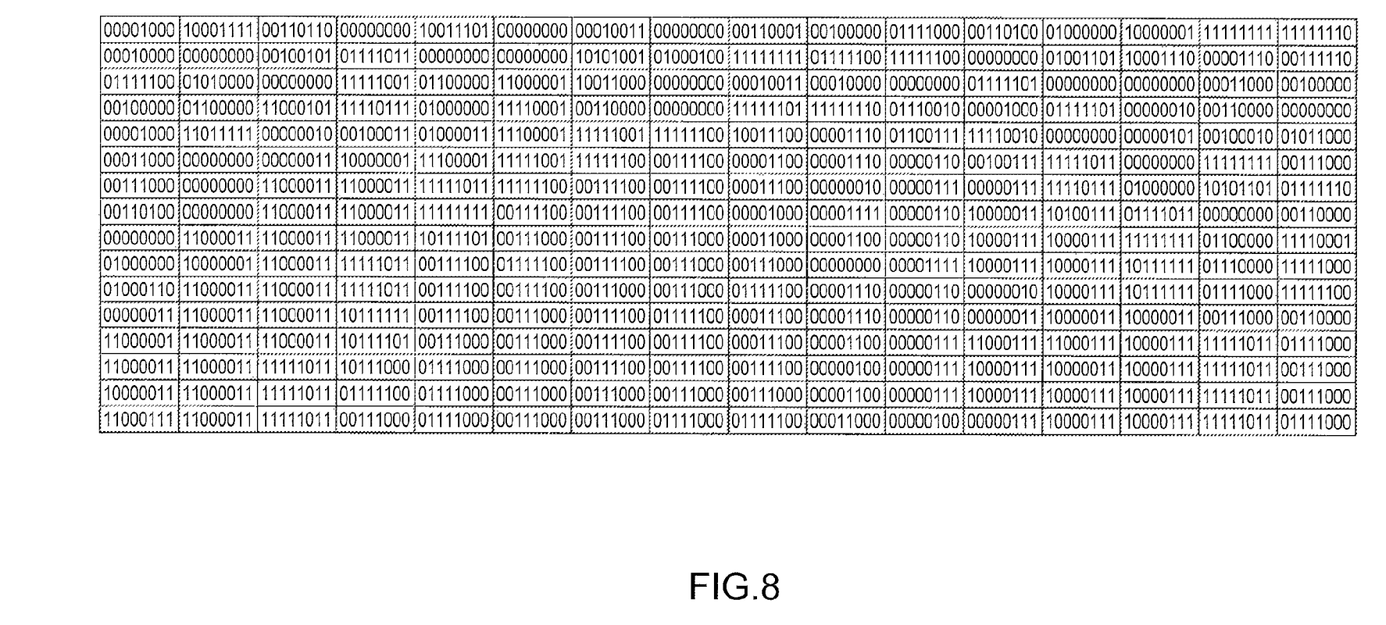
FIG. 8 is an illustration showing an example of binary patterns corresponding to an image of a target.
Figure 9:
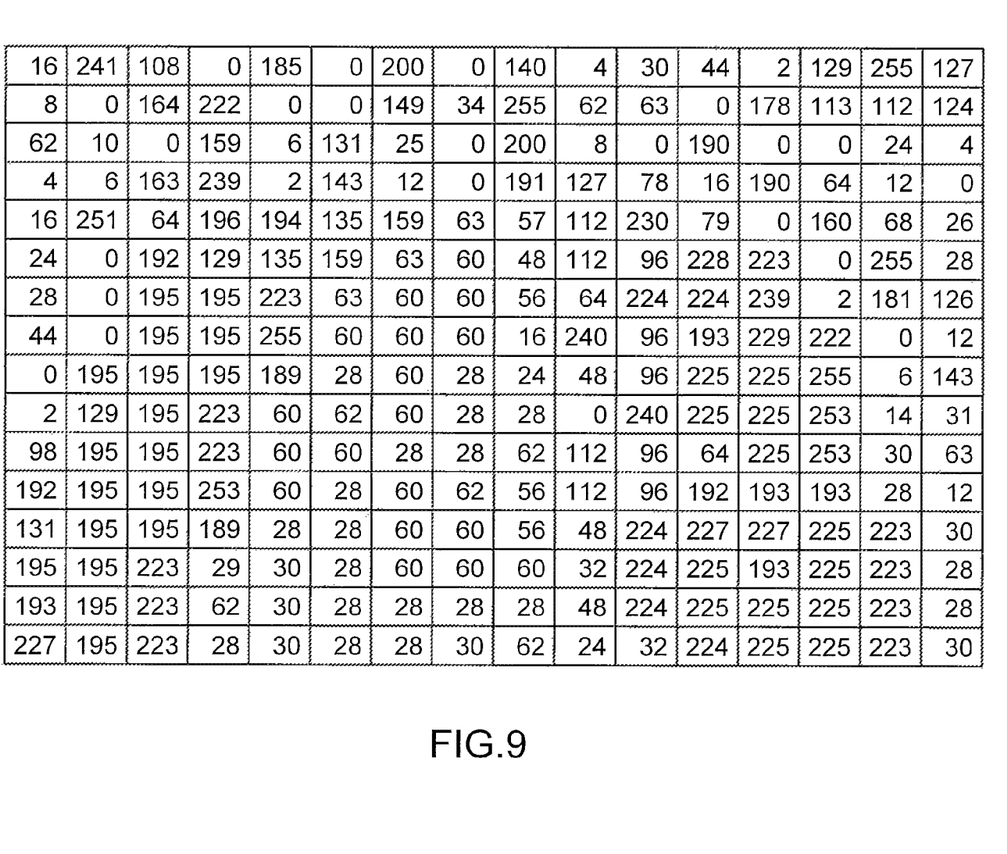
FIG. 9 is an illustration expressing the binary patterns in FIG. 8 as decimal numbers.

FIG. 7A is an illustration showing an example of the pixel values of the pixel of interest and the peripheral pixels surrounding the pixel of interest. FIG. 7B is an illustration showing pixel values of the binarized peripheral pixels. FIG. 7C is an illustration showing a binary pattern. Specifically, the feature vector calculator 13 converts pixel values "109", "103", "98", and "125" of the peripheral pixels pix_p3 to 6 which are smaller than a pixel value "131" of the pixel of interest pix_c into "0" of binary. Moreover, the feature vector calculator 13 converts pixel values "144", "134", "142", and "144" of the peripheral pixels pix_p1, 2, 7, and 8 which are larger than the pixel value "131" of the pixel of interest pix_c into "1" of a binary. Then, the feature vector calculator 13 ranks the pixel values of the binarized peripheral pixels pix_p1 to pix_p8 in an order expressed by an arrow in FIG. 7B to calculate a binary pattern BP "11000011" (in FIG. 7C). The feature vector calculator 13 calculates the binary pattern for each pixel of interest while shifting the pixel of interest one by one. FIG. 8 is an illustration showing an example of binary patterns each for each pixel. FIG. 9 expresses decimalized FIG. 8 and is substantially the same as FIG. 8.

Note the feature vector calculator 13 may calculate the binary pattern by a method different from that in FIG. 7. For example, the feature vector calculator 13 may calculate the binary pattern according to Formula (1) and Formula (2) below.

$$0 \text{ if } c/(1+\alpha) < In < c(1+\alpha) \tag{1}$$

$$1 \text{ otherwise} \tag{2}$$

Here, "c" represents the pixel value of the pixel of interest. "α" represents a threshold larger than zero. "In" represents the pixel value of the peripheral pixel. According to this formula, the pixel value "In" of the peripheral pixel becomes "0" (first value) when being larger than a value obtained by dividing the pixel value "c" of the pixel of interest by 1+α (predetermined value) and smaller than a value obtained by multiplying the pixel value "c" of the pixel of interest by 1+α. On the other hand, the pixel value "In" of the peripheral pixel becomes "1" (second value) when being equal to or less than a value obtained by dividing the pixel value "c" of the pixel of interest by 1+α or equal to or more than a value obtained by multiplying the pixel value "c" of the pixel of interest by 1+α. According to these conditional expressions, the pixel value of the peripheral pixel having smaller difference from the pixel value of the pixel of interest becomes "0", and the pixel value of the peripheral pixel having larger difference from the pixel value of the pixel of interest becomes "1". This exerts an effect that either case where a light incident on an object is from front or back (backlight) can be detected with high accuracy.

Subsequently, the feature vector statistical analyzer 14 generates a histogram for each cell set by the cell learning unit 11 by counting the feature vector (S7).

Figure 10A:
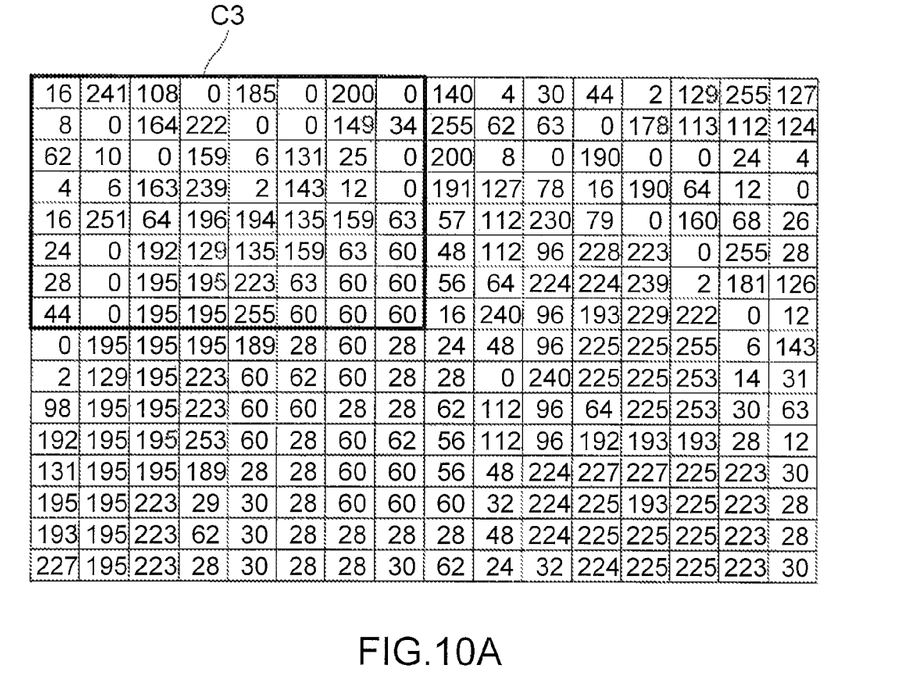
FIGS. 10A to 10B are each an illustration showing a cell set to a part in FIG. 9.
Figure 10B:
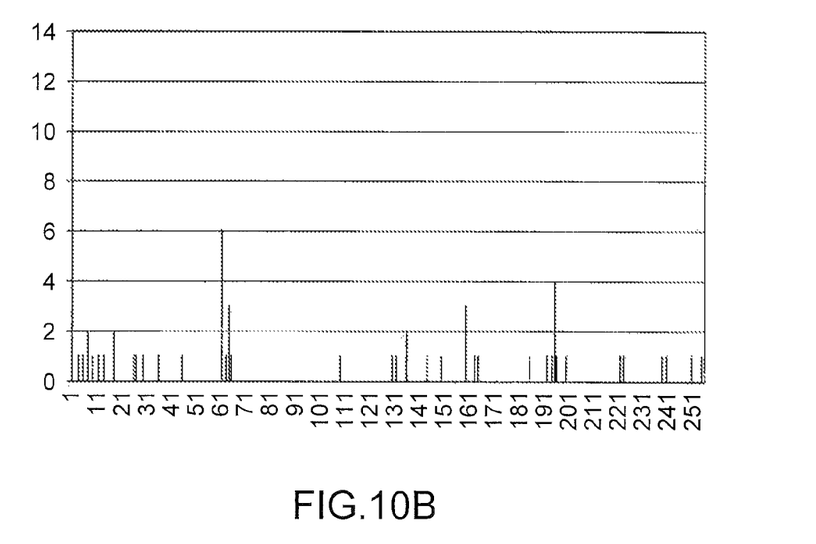

In a case, for example, where an upper left end area of 8×8 pixels in the binary patterns shown in FIG. 9 corresponds to the cell C3 in FIG. 4, the feature vector statistical analyzer 14 sets the cell C3 with respect to this area as shown in FIG. 10A. Then, the feature vector statistical analyzer 14 counts the binary patterns of the cell to obtain a histogram. A histogram in FIG. 10B has a horizontal axis of a pixel value and a vertical axis of the number of occurrences of the pixel value in the cell C3. Since the cell C3 is an area set on the basis of the mean position and variance of the feature point "P3" in FIG. 4, the histogram in FIG. 10B represents the distribution of the appearance frequency of the feature point "P3".

Figure 11A:
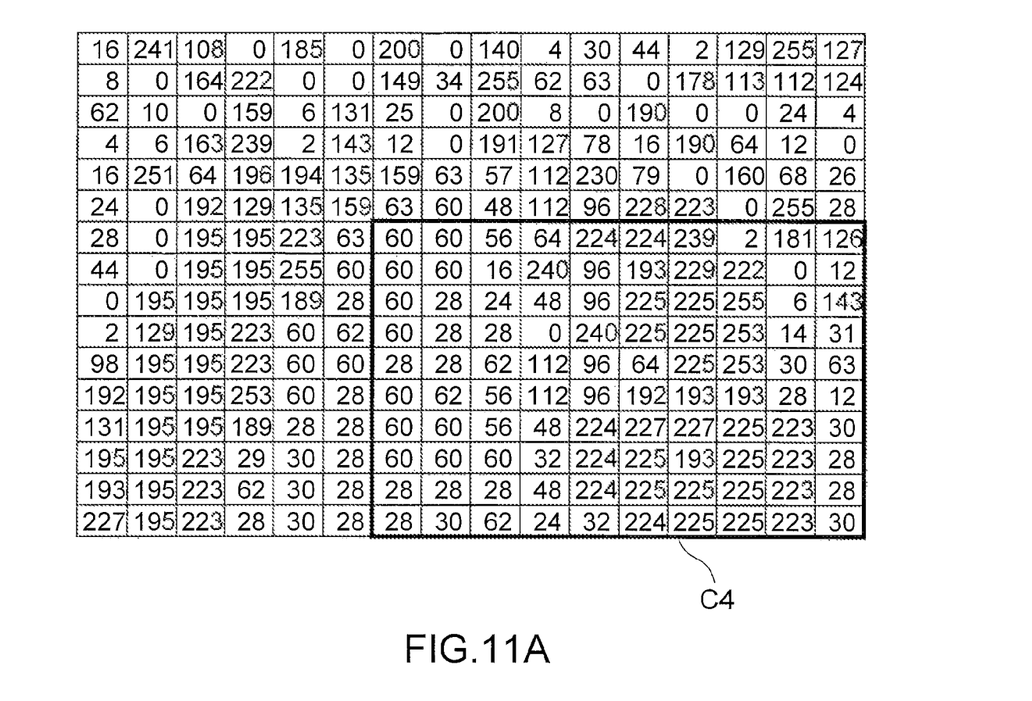
FIGS. 11A to 11B are each an illustration showing a cell set to another part in FIG. 9.
Figure 11B:
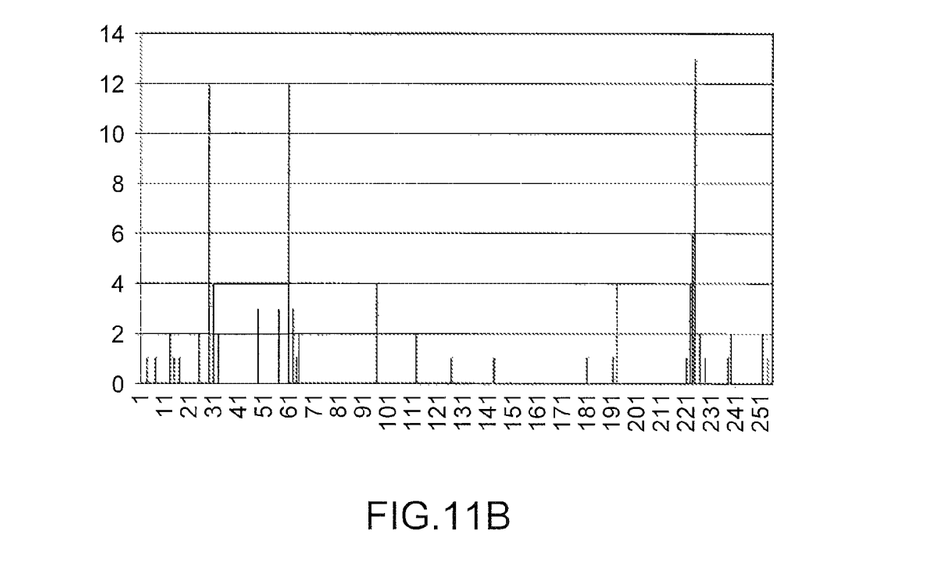

Additionally, in a case, for example, where a lower right end area of 10×10 pixels in the binary patterns shown in FIG. 9 corresponds to the cell C4 in FIG. 4, the feature vector statistical analyzer 14 sets the cell C4 with respect to this area as shown in FIG. 11A. Then, the feature vector statistical analyzer 14 counts the binary patterns to obtain a histogram. Since the cell C4 is an area set on the basis of the mean position and variance of the feature point "P4" in FIG. 4, a histogram in FIG. 11B represents the distribution of the feature point "P4".

Subsequently, the recognizer 15 recognizes a target on the basis of the generated histogram (S8). The recognizer 15 can identify the human hand H having the feature points "P3" and "P4" on the basis of the histograms in FIG. 10B and FIG. 11B. Moreover, the histogram is generated within the limited cell set in advance, and thus, the recognizer 15 can analyze the histogram to complete recognition of the target in a short time.

As described above, according to this embodiment, the cell learning unit 11 uses a plurality of images of the target for learning use to set the cell. Then, the histogram is created by counting the feature vector within each cell in the image. This allows the feature of the target to be detected with good accuracy only by counting the feature vector within the cell without setting the feature point in the target. In this way, according to this embodiment, the limitation to the cell having the count area for the feature vector set thereon makes it possible to rapidly identify the target to be identified with high accuracy.

Second Embodiment

A size of the target intended to be identified is not necessarily the same as the size of the target for learning use. In a second embodiment, the size of the image is adjusted in conformity with the size of the cell. In the second embodiment, components corresponding to the first embodiment in which are designated by the same reference symbols and the duplicated description is omitted.

Figure 12:
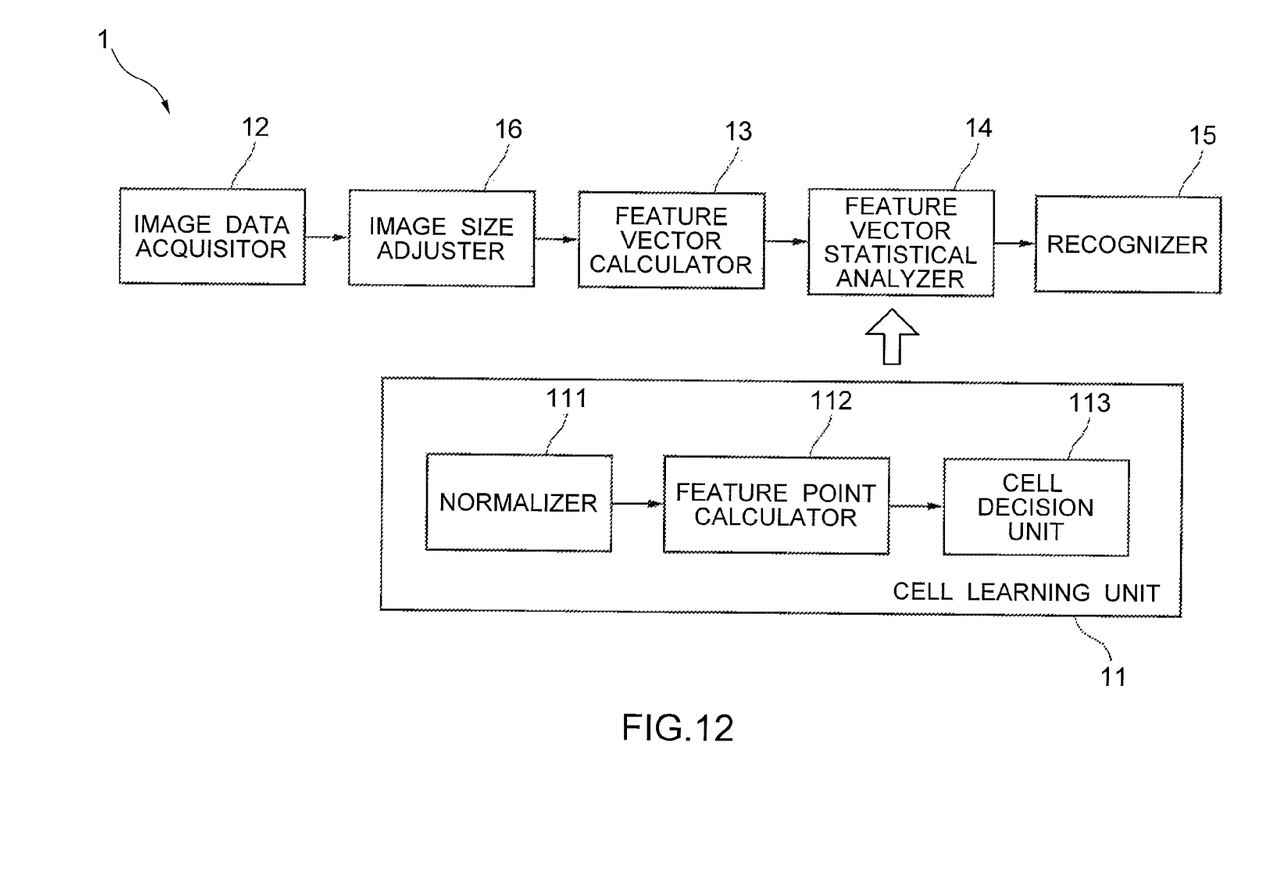
FIG. 12 is a block diagram of the feature vector extraction device 1 showing a second embodiment.

FIG. 12 is a block diagram of the feature vector extraction device 1 showing the second embodiment. The feature vector extraction device 1 in this embodiment includes an image size adjuster 16 between the image data acquisitor 12 and the feature vector calculator 13. The image size adjuster 16 extends or reduces the image data containing the target to conform to the size of the cell. Moreover, the image size adjuster 16 may match the size of the image data with a size of the image normalized by the normalizer 111. According to this embodiment, the size of the image data acquired by the image data acquisitor 12 can be conformed to the size of the cell decided by the cell learning unit 11, which makes it possible to identify the target to be identified with high accuracy regardless of difference in magnification of the image data.

Third Embodiment

Figure 13:
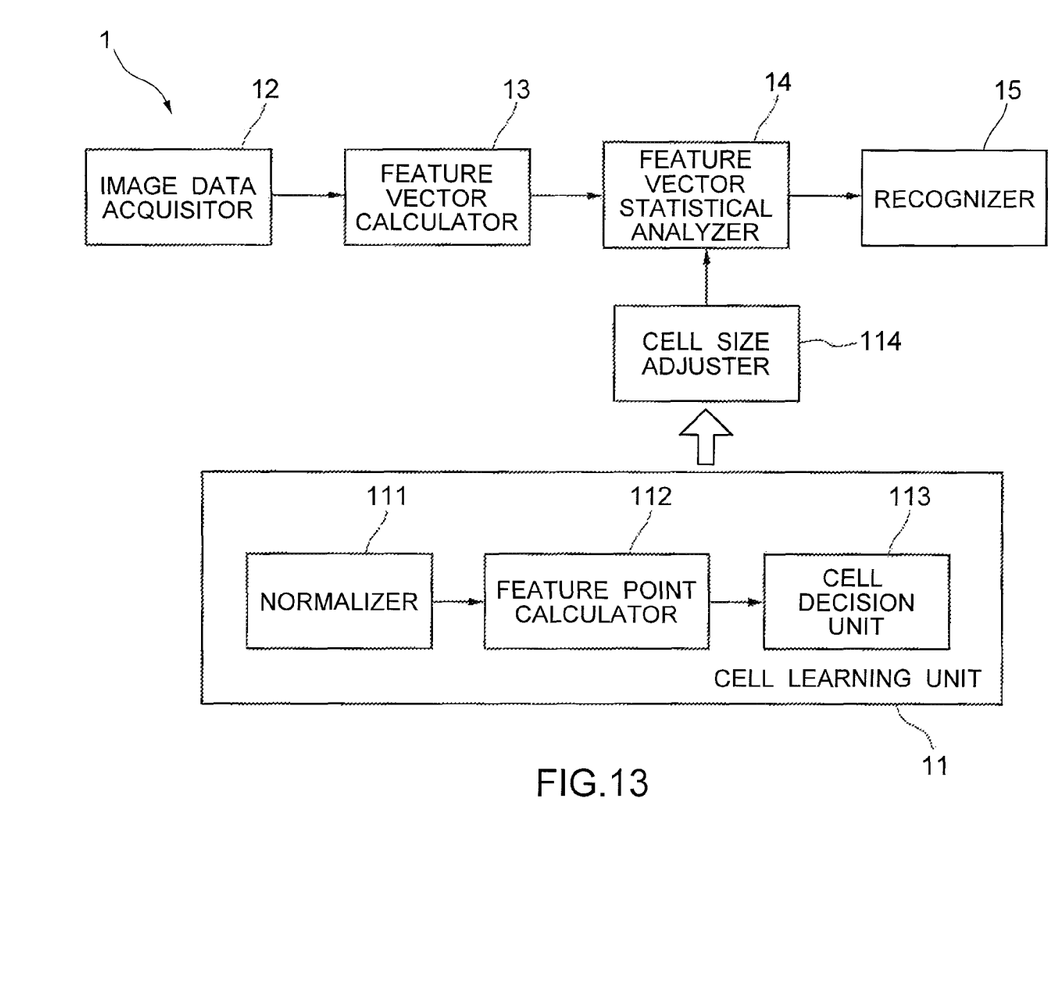
FIG. 13 is a block diagram of the feature vector extraction device 1 showing a third embodiment.

FIG. 13 is a block diagram of the feature vector extraction device 1 showing a third embodiment. Components corresponding to the first embodiment are designated by the same reference symbols and the duplicated description is omitted. This embodiment includes a cell size adjuster 114 between the feature vector statistical analyzer 14 and the cell learning unit 11. The cell size adjuster 114 extends or reduces the cell to conform to the size of the image data. According to this embodiment, the size of the cell decided by the cell decision unit 113 can be conformed to the size of the image data acquired by the image data acquisitor 12, which makes it possible to identify the target to be identified with high accuracy regardless of the size of the image data.

At least a part of the feature vector extraction device in this embodiment may be configured to include hardware or software. In the case of a configuration including the software, a program implementing at least a part of functions of the feature vector extraction device may be stored in a storage medium such as a flexible disk or CD-ROM, and executed by being read out by a computer. The storage medium may include a fixed type storage medium such as a hard disk device or a memory with no limitation to those detachable such as a magnetic disk or an optical disk.

Moreover, the program implementing at least a part of the functions of the feature vector extraction device may be distributed via a telecommunication line such as the Internet (including wireless communication). Further, the relevant program may be distributed via a wired line or wireless line such as the Internet or with being stored in the storage medium, in a state of being encrypted, modulated or compressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A feature vector extraction device comprising:
a processor that sets a plurality of cells each representing a position and range for counting a feature vector of a target on the basis of a plurality of images containing a target for learning use, wherein the target is a multi-jointed body and wherein the processor is configured to:
select two feature points from among three or more feature points which are set in the image and represent the target for learning use, and normalize a size and direction of each of the feature points,
calculate a mean position and a variation from the mean position for each of other feature points than the selected two feature points of the normalized feature points,
decide a position of each of the cells on the basis of the mean position and decide a size of the each of the cells on the basis of the variation,
count the feature vector based on the position and the size of each of the cells;
generate a histogram obtained by counting the feature vector for each of the cells; and
use the histogram to recognize the target.

2. A feature vector extraction device comprising:
a processor that acquires image data of an image containing a target, wherein the target is a multi-jointed body and wherein the processor is configured to:
calculate a feature vector of the target on the basis of the image data,
count all feature vectors in a cell for each of a plurality of cells which are respectively set to a plurality of areas in the image containing the target, each cell having a size corresponding to each area,
set the plurality of cells each representing a position and range for counting the feature vector of the target on the basis of a plurality of images containing a target for learning use,
select two feature points from among three or more feature points which are set in each of a plurality of images containing a target for learning use, and normalizes a size and direction of each of the feature points,
calculate a mean position and a variation from the mean position for each of other feature points than the selected two feature points of the normalized feature points,
decide a position of each of the cells on the basis of the mean position and decides a size of the each of the cells on the basis of the variation;
generate a histogram obtained by counting the feature vector for each of the cells; and
use the histogram to recognize the target.

3. The feature vector extraction device according to claim 2, wherein the processor decides the size of the plurality of cells on the basis of a value obtained by multiplying a variance indicating the variation by a constant.

4. The feature vector extraction device according to claim 3, wherein the processor sets the value obtained by multiplication by a constant depending on a kind of the target.

5. The feature vector extraction device according to claim 2, wherein the recognized target is used as the target for learning use.

6. The feature vector extraction device according to claim 2, wherein the feature vector is a binary pattern obtained by converting into a binary a pixel value of each of a plurality of peripheral pixels surrounding a pixel of interest on the basis of a magnitude relationship between the pixel value and a pixel value of the pixel of interest, and
the processor:
sets a first value of the binary to the pixel value of the peripheral pixel which is larger than a value obtained by dividing the pixel value of the pixel of interest by a predetermined value and smaller than a value obtained by multiplying the pixel value of the pixel of interest by the predetermined value, and
sets a second value of the binary to the pixel value of the peripheral pixel which is equal to or less than a value obtained by dividing the pixel value of the pixel of interest by the predetermined value and equal to or more than a value obtained by multiplying the pixel value of the pixel of interest by the predetermined value.

7. The feature vector extraction device according to claim 2, wherein the processor extends or reduces the image data to conform to the size of the cell.

8. The feature vector extraction device according to claim 2, wherein the processor extends or reduces the cell to conform to the size of the image data.

9. The feature vector extraction device according to claim 2, wherein the target for learning use is an object having a plurality of joints.

10. The feature vector extraction device according to claim 1, wherein the processor extends or reduces the image data to conform to the size of the cell.

11. The feature vector extraction device according to claim 1, wherein the processor extends or reduces the cell to conform to the size of the image data.

12. The feature vector extraction device according to claim 1, wherein the target for learning use is an object having a plurality of joints.

13. A feature vector extraction device comprising:
a computer that sets a plurality of cells each representing a position and range for counting a feature vector of a target on the basis of a plurality of images containing a target for learning use, wherein the target is a multi-jointed body and wherein the computer is configured to:
select two feature points from among three or more feature points which are set in the image and represent the target for learning use, and normalizes a size and direction of each of the feature points,
calculate a mean position and a variation from the mean position for each of other feature points than the selected two feature points of the normalized feature points,
decide a position of each of the cells on the basis of the mean position and decides a size of the each of the cells on the basis of the variation,
count the feature vector based on the position and the size of each of the cells;
generate a histogram obtained by counting the feature vector for each of the cells; and
use the histogram to recognize the target.

* * * * *